(12) United States Patent
Chen et al.

(10) Patent No.: US 12,469,608 B2
(45) Date of Patent: Nov. 11, 2025

(54) MINING METHOD FOR SAMPLE GROUPING

(71) Applicant: Industrial Technology Research Institute, Hsinchu (TW)

(72) Inventors: Guan-An Chen, Hsinchu (TW); Jhen-Yang Syu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 167 days.

(21) Appl. No.: 17/219,901

(22) Filed: Apr. 1, 2021

(65) Prior Publication Data

US 2022/0215966 A1    Jul. 7, 2022

(30) Foreign Application Priority Data

Jan. 5, 2021  (TW) ................. 110100290

(51) Int. Cl.
  *G16H 50/70* (2018.01)
  *G06N 20/00* (2019.01)
  *G16H 30/40* (2018.01)

(52) U.S. Cl.
  CPC ............ *G16H 50/70* (2018.01); *G16H 30/40* (2018.01)

(58) Field of Classification Search
  CPC ......... G16H 50/50; G16H 50/70; G16B 40/30
  See application file for complete search history.

(56) References Cited

U.S. PATENT DOCUMENTS

| | | | |
|---|---|---|---|
| 10,484,399 B1 | 11/2019 | Curtin | |
| 2020/0160178 A1* | 5/2020 | Kar | G06F 16/9024 |
| 2020/0211185 A1* | 7/2020 | Hu | G06T 5/20 |
| 2020/0405148 A1 | 12/2020 | Tran | |
| 2021/0374518 A1* | 12/2021 | Zhu | G06F 9/3877 |
| 2022/0114444 A1* | 4/2022 | Weinzaepfel | G06N 3/084 |
| 2023/0289592 A1* | 9/2023 | Badri | G06F 18/2155 |

FOREIGN PATENT DOCUMENTS

| | | |
|---|---|---|
| CN | 105631037 | 6/2016 |
| CN | 108804470 | 11/2018 |
| CN | 109919928 | 6/2019 |
| CN | 107330074 | 5/2020 |

(Continued)

OTHER PUBLICATIONS

Garg, Prachi, et al. "Memorization and Generalization in Deep CNNS Using Soft Gating Mechanisms." (2019). ( Year: 2019).*

(Continued)

*Primary Examiner* — Jason B Dunham
*Assistant Examiner* — Constantine Siozopoulos
(74) *Attorney, Agent, or Firm* — JCIPRNET

(57) ABSTRACT

A mining method for sample grouping is provided. The method includes the following steps. A field dataset including multiple samples is obtained, and each sample corresponds to an actual labeled result. The samples are respectively input to an existing model, so as to obtain the estimated results. An outlier sample set in the field dataset is removed based on a difference distribution of the estimated results and the actual labeled results, and the samples that remain in the field dataset form a remaining sample set. The remaining sample set is grouped into a hard sample set and an easy sample set based on the estimated results of the remaining sample set.

8 Claims, 5 Drawing Sheets

(56) References Cited

FOREIGN PATENT DOCUMENTS

| | | | |
|---|---|---|---|
| CN | 111709485 | 9/2020 | |
| CN | 112164447 | 1/2021 | |
| TW | 201942769 | 11/2019 | |
| TW | I689875 | 4/2020 | |
| TW | 202020885 | 6/2020 | |
| WO | WO-2020061489 A1 * | 3/2020 | ............. G06F 17/18 |

OTHER PUBLICATIONS

Tsai-Yuan Chou, "Generating Virtual Attributes by Fuzzy Clustering Algorithm for Small Datasets Learning," with English translation of the Abstract thereof, Postgraduate Programs in Management, I-Shou University, May 2015, pp. 1-48.

"Office Action of Taiwan Counterpart Application", issued on May 18, 2022, p. 1-p. 11.

* cited by examiner

MINING METHOD FOR SAMPLE GROUPING

CROSS-REFERENCE TO RELATED APPLICATION

This application claims the priority benefit of Taiwan application serial no. 110100290, filed on Jan. 5, 2021. The entirety of the above-mentioned patent application is hereby incorporated by reference herein and made a part of this specification.

BACKGROUND

Technical Field

The disclosure relates to a data mining method, particularly to a mining method for sample grouping.

Description of Related Art

Development for artificial intelligence (AI) has been explosive along with the rapid increase in computing power and storage capacity of computers as well as the assembly of various types of big data. One of the important issues in the field of AI is smart healthcare. In terms of medical images, AI not only assists in accurate diagnosis and telemedicine, but also helps mine the hidden information based on past cases, experience, and multiple medical indicators of patients, which further provides assistance in medical decision-making. AI healthcare has become an important indicator of smart healthcare in the future.

However, in AI healthcare, the construction of an AI model for interpreting medical images is not only costly, but also time-consuming and labor-intensive. According to the survey, during the process of building an AI model for medical images, half of the resources are spent on collecting and labelling the medical images. Therefore, it is one of the current issues to build an AI model using limited resources.

SUMMARY

The disclosure provides a mining method for sample grouping capable of speeding up model building.

The mining method for sample grouping of the present disclosure includes: (a) obtaining a field dataset, where the field dataset includes multiple samples, and the samples have multiple corresponding actual labeled results; (b) inputting the samples respectively into an existing model, so as to obtain multiple estimated results; (c) removing an outlier sample set from the field dataset based on a difference distribution of the estimated results and the actual labeled results, where the samples that remain in the field dataset after the outlier sample set is removed form a remaining sample set; and (d) grouping the remaining sample set into a hard sample set and an easy sample set based on the estimated results of the remaining sample set.

In an embodiment of the present disclosure, after step (b), the method further includes: calculating the difference distribution of the estimated results and the actual labeled results; checking whether the difference distribution is a normal distribution through a normal distribution testing method; performing step (c) and step (d) in sequence when the difference distribution is determined to be a normal distribution; and selecting another existing model when the difference distribution is determined to be not a normal distribution, and performing step (b) again.

In an embodiment of the present disclosure, calculating the difference distribution of the estimated results and the actual labeled results includes: calculating a difference between the estimated results of each sample and its corresponding actual labeled result through a loss function to thereby obtain the difference distribution.

In an embodiment of the present disclosure, the loss function adopts cross-entropy.

In an embodiment of the present disclosure, step (c) includes: determining a sample with the difference greater than a first setting value or a sample with the difference smaller than a second setting value as an outlier sample set.

In an embodiment of the present disclosure, step (d) includes: calculating an absolute value of the difference corresponding to each of the samples in the remaining sample set, so as to obtain an absolute-value distribution; performing a normalization conversion on the absolute-value distribution, so as to obtain a normalized distribution; and based on the normalized distribution, grouping the remaining sample set into the hard sample set and the easy sample set.

In an embodiment of the present disclosure, based on the normalized distribution, grouping the remaining sample set into the hard sample set and the easy sample set including: grouping samples that meet a first threshold number into the easy sample set, starting from a sample having an absolute value of a normalized difference in the normalized distribution being 0; and grouping samples that meet a second threshold number into the hard sample set, starting from a sample having an absolute value of a normalized difference in the normalized distribution being 1.

In an embodiment of the present disclosure, the sample number of the easy sample set is greater than the sample number of the hard sample set.

Based on the above, by grouping the samples in the field dataset, samples that have led to a decline in the accuracy of interpretation of the existing model may be found, and samples with high similarity to the existing model's classification probability characteristic may be obtained. By mixing the latter with a certain proportion of samples with low similarity, a new dataset is formed, and the goal of rapid model establishment and/or model optimization is achieved.

DESCRIPTION OF THE EMBODIMENTS

Figure 1:
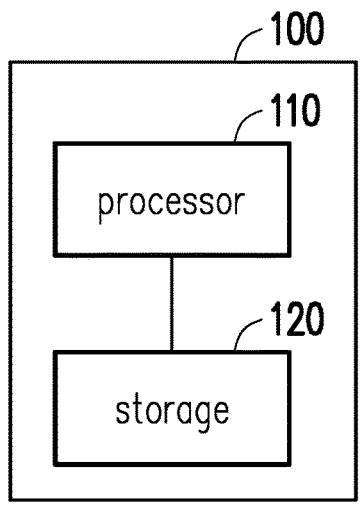
FIG. 1 is a block diagram of an electronic device according to an embodiment of the disclosure.

FIG. 1 is a block diagram of an electronic device according to an embodiment of the disclosure. In FIG. 1, an electronic device 100 includes a processor 110 and a storage 120. The processor 110 is, for example, a central processing unit (CPU), a physical processing unit (PPU), a programmable microprocessor, an embedded control chip, and a digital signal processor (DSP), application specific integrated circuits (ASIC), or other similar devices.

The storage 120 is, for example, any type of fixed or removable random access memory (RAM), a read-only memory (ROM), flash memory, hard disk, other similar device, or a combination thereof. A plurality of code snippets are stored in the storage 120, and the code snippets are executed by the processor 110 after being installed to implement the following mining method for sample grouping.

In recent years, the source codes of more and more technologies have been released, and a large amount of open-source materials and well-trained existing models are easy to obtain. Take an open-source dataset (such as Kaggle dataset) for building a model for the severity of diabetic retinal fundus disease (an existing model) as an example. The characteristic distribution of the artificial intelligence training dataset determines the performance of this model. The characteristic of the samples included in the open-source dataset may cover differences in gender, ethnicity, etc. If the existing model is applied to a field dataset that is different from the field corresponding to the open-source dataset, its interpretation is likely to be inaccurate. For example, the high myopia population in Asia is relatively high, and fundus images are more likely to have characteristic like tiger stripes. The user can only obtain the existing model and its interpretation accuracy, without being clear about the composition of the samples for training in the training phase. In the following embodiments, a set of interpretation models suitable for a designated field is quickly established by using an existing model that has been trained with a small sample number.

Figure 2:
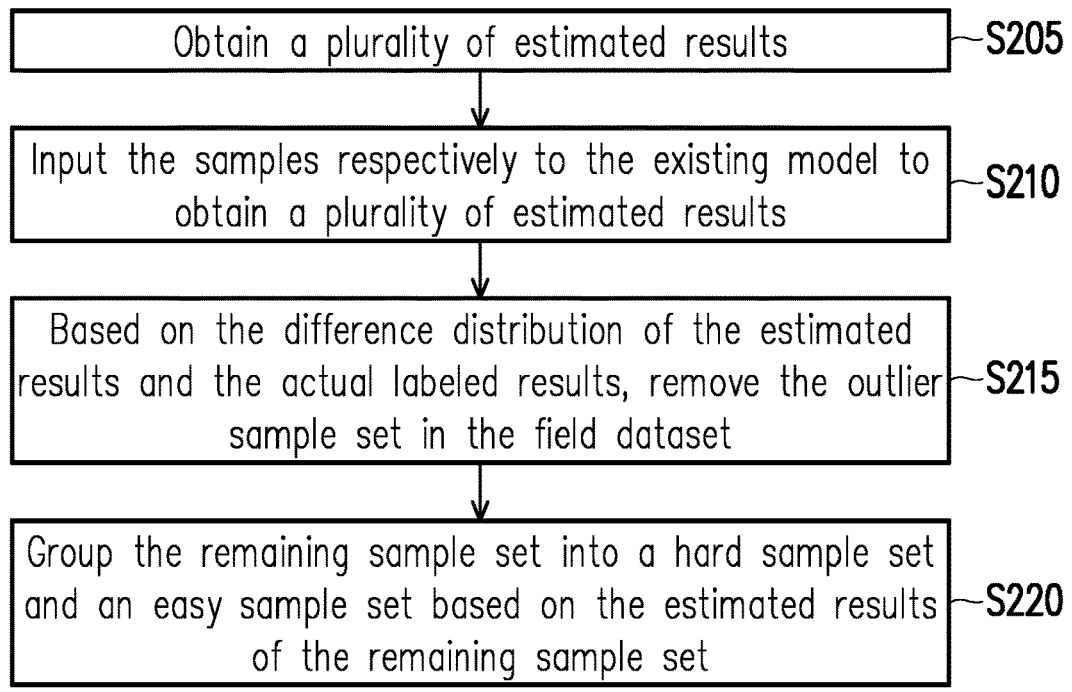
FIG. 2 is a flowchart of a mining method for sample grouping according to an embodiment of the present disclosure.

FIG. 2 is a flowchart of a mining method for sample grouping according to an embodiment of the present disclosure. In FIG. 2, a field dataset is obtained in step S205. Here, the field dataset includes a plurality of samples collected based on a specified field, and each sample has a corresponding actual labeled result. Users may collect samples of the designated field according to their needs, and the sample number collected does not need to be as many as the sample number used for training the model. A small sample number may also achieve the purpose of optimizing the interpretation model.

Next, in step S210, the samples are respectively input to the existing model to obtain a plurality of estimated results. The existing model is adapted to extract characteristic from the new field dataset and express it with high-dimensional vectors. The existing model is a classification model adapted to classify input data into specified categories. Assume that the classification model is a Gaussian function model f(x), by inputting each sample of the field dataset into the Gaussian function model f(x), the probability density function P(x) belonging to the specified category may be calculated (and its value is the estimated results p).

The Gaussian function model f(x) is as follows:

$$f(x) = G(\mu, \sigma) = \frac{1}{(2\pi)^{D/2}} \frac{1}{|\sigma|^{1/2}} \exp\left\{-\frac{1}{2}(x-\mu)^T \sigma^{-1}(x-\mu)\right\}.$$

Among the above, x represents the characteristic vector of the sample, D represents the dimension of the characteristic vector of the sample, and μ and σ are respectively the expected value and the variance. For example, if P(x)≥0.5, it is determined as the first category; if P(x)<0.5, it is determined as the second category.

Figure 3:
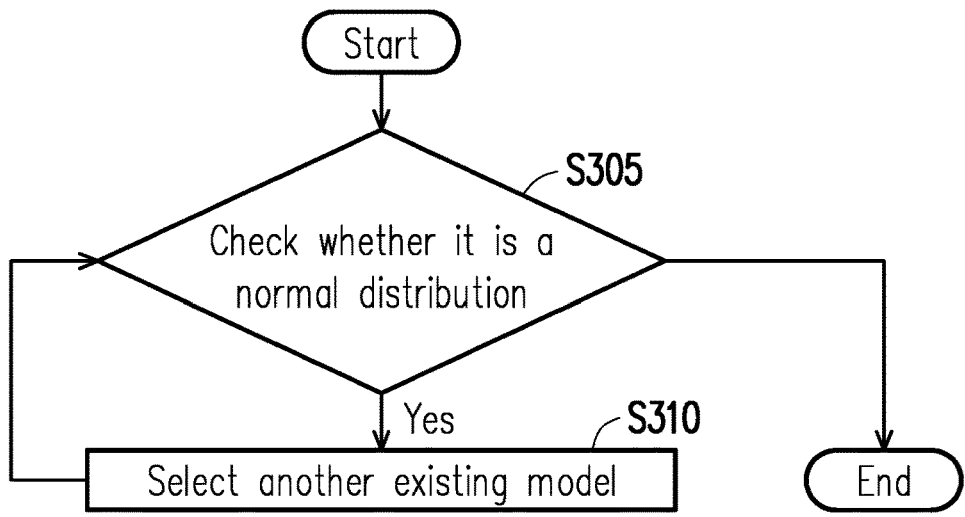
FIG. 3 is a flowchart of a method for determining the feasibility of an existing model according to an embodiment of the present disclosure.

Here, in order to avoid that the selected existing model is not suitable for the field dataset, the usability of the existing model is further determined. FIG. 3 is a flowchart of a method for determining the feasibility of an existing model according to an embodiment of the present disclosure. In FIG. 3, it is checked whether it is a normal distribution in step S305. Specifically, first, a difference distribution of the estimated results and the actual labeled results is calculated. Here, the difference (a loss value) between the estimated result (p) of each sample and its corresponding actual labeled result (q) is calculated through the loss function L(p,q) to thereby obtain the difference distribution. The loss function is designed to quantify the difference between the predicted results of the evaluation model and the actual labeled results. The loss function may adopt mean square difference, average absolute difference, or cross-entropy. For example, if the existing model deals with a classification issue, cross entropy may be selected to be used as the loss function.

If the cross entropy is used as the loss function, the loss function L(p,q) is:

$$L(p, q) = -\sum_i p_i \log_2(q_i).$$

Among the above, $p_i$ represents the estimated results of the i-th sample, and $q_i$ represents the actual labeled result of the i-th sample.

Figure 4:
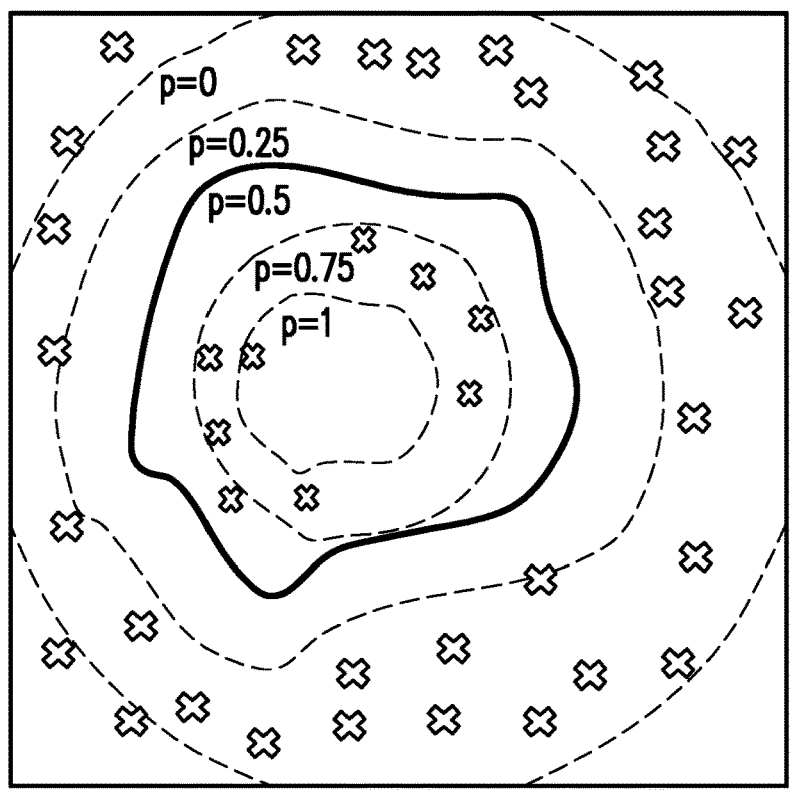
FIG. 4 is a distribution diagram of estimated results of a field dataset applied to an existing model according to an embodiment of the present disclosure.
Figure 5:
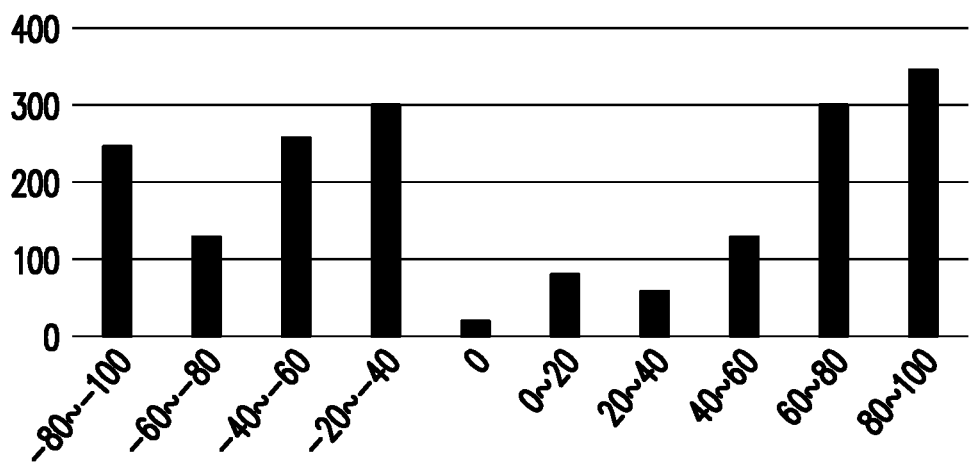
FIG. 5 is a schematic diagram based on the difference distribution of FIG. 4 according to an embodiment of the present disclosure.

After the difference is obtained, the normal distribution testing method is used to test whether the difference distribution is a normal distribution. FIG. 4 and FIG. 5 are given below to illustrate existing models that are not feasible. FIG. 4 is a distribution diagram of estimated results of a field dataset applied to an existing model according to an embodiment of the present disclosure. FIG. 5 is a schematic diagram based on the difference distribution of FIG. 4 according to an embodiment of the present disclosure.

In FIG. 4, for example, the probability density function is used to calculate the probability (i.e., the estimated result) p (0≤p≤1) of each sample. The closer the sample is to the center point, the higher the p-value, which means that the sample is more suitable for the selected existing model; the farther the sample is from the center, the lower the p-value, which means that the sample is less suitable for the selected existing model.

In FIG. 5, the horizontal axis represents the difference, and the vertical axis represents the sample number. The loss function L(p,q) is used to obtain the difference of each sample shown in FIG. 4, and the difference distribution shown in FIG. 5 is obtained. It can be clearly seen from FIG. 5 that there are few samples whose estimated results are the same as the actual labeled results (the difference is 0), which means that the selected existing model is not suitable for this field dataset. Here, whether the difference distribution is a normal distribution may be determined by using the normal distribution testing method.

Generally speaking, normal distribution testing methods include Kolmogorov-Smirnov test and Shapiro-wilk test. In the normal distribution, the expected value μ is equal to the position parameter, which determines the location of the distribution; its variance a is equal to the scale parameter, which determines the magnitude of the distribution. For example, when the number of the samples is less than 50, the W value of the Shapiro-wilk test is used to detect whether it is a normal distribution. When the W value is greater than 0.05, the difference distribution is determined to be a normal distribution. When the value of W is not greater than 0.05, the difference distribution is determined to be an abnormal distribution.

When the number of the samples is greater than 50, the D value of the Kolmogorov-Smirnov test is used to detect whether it is a normal distribution. When the D value is greater than 0.05, the difference distribution is determined to be a normal distribution. When the value of D is not greater than 0.05, the difference distribution is determined to be an abnormal distribution.

In step S305, when the difference distribution is determined to be a normal distribution, it means that the selected existing model is suitable for the selected field dataset, so the process of determining the feasibility of the existing model is ended, and step S215 and step S220 of FIG. 2 are sequentially executed. When determining that the difference distribution is not a normal distribution, it indicates that the selected existing model is not suitable for the selected field dataset, so another existing model is selected as shown in step S310, and step S305 is executed again until the selected existing model is found suitable for the selected field dataset.

Returning to FIG. 2, in step S215, based on the difference distribution of the estimated results and the actual labeled results, the outlier sample set in the field dataset is removed. And the samples that remain in the field dataset after the outlier sample set is removed form the remaining sample set. Here, samples with a difference greater than the first setting value or samples with a difference less than the second setting value are determined to be in an outlier sample set.

Figure 6:
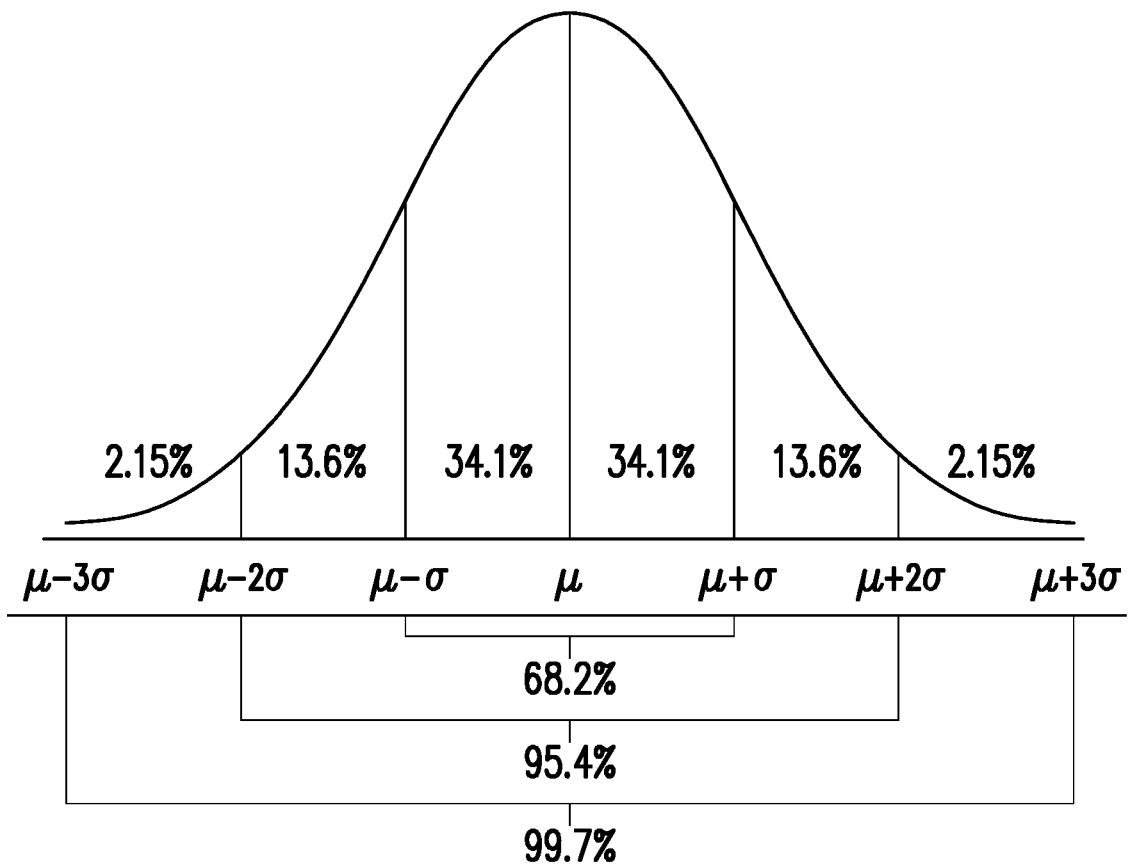
FIG. 6 is a difference statistical diagram according to an embodiment of the disclosure.

FIG. 6 is a difference statistical diagram according to an embodiment of the disclosure. In FIG. 6, the expected value μ in the normal distribution is equal to the location parameter, which determines the location of the distribution; its variance σ is equal to the scale parameter, which determines the magnitude of the distribution. As shown in FIG. 6, the sample number with a difference ranging from μ−σ to μ+σ accounts for 68.2% of the total number of the samples, the sample number with a difference ranging from μ−2σ to μ+2σ accounts for 95.4% of the total number of the samples, and the sample number with a difference ranging from μ−3σ to μ+3σ accounts for 99.7% of the total number of the samples.

In this embodiment, the first setting value is set as μ+3σ, and the second setting value is set as μ−3σ. Therefore, samples with a difference $L(x_i)$ greater than the first setting value μ+3σ or samples with a difference $L(x_i)$ smaller than the second setting value μ−3σ are determined to be the outlier sample set.

After removing the outlier sample set, in step S220, the remaining sample set is grouped into a hard sample set and an easy sample set based on the estimated results of the remaining sample set. Specifically speaking, the absolute value of the difference corresponding to each sample in the remaining sample set is first calculated, so as to obtain the absolute-value distribution. The absolute value of the difference L'(p,q) is as follows:

$$L'(p, q) = \left| -\sum_i p_i \log_2(q_i) \right|.$$

Figure 7:
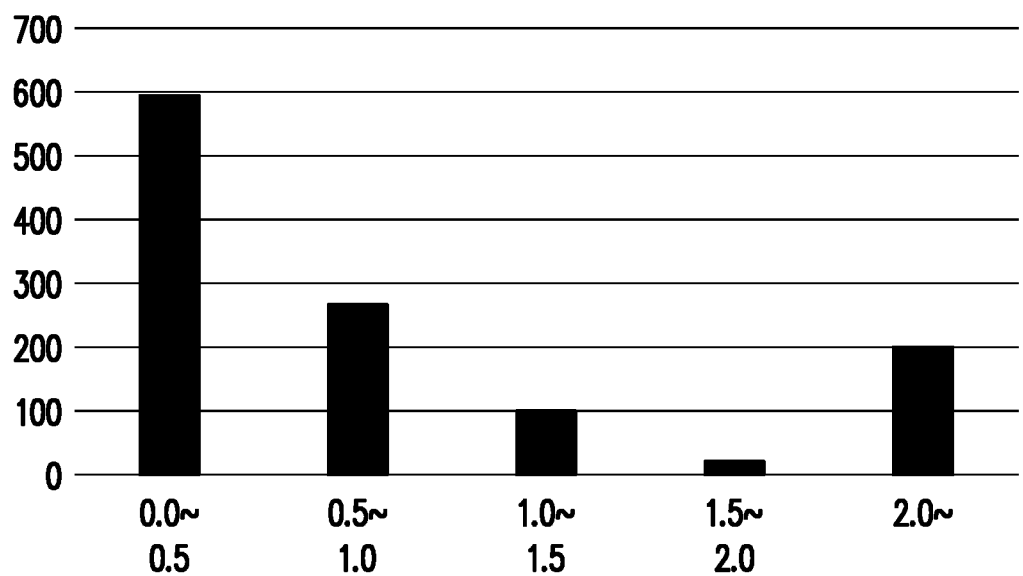
FIG. 7 is a schematic diagram of an absolute-value distribution according to an embodiment of the disclosure.

FIG. 7 is a schematic diagram of an absolute-value distribution according to an embodiment of the disclosure. In FIG. 7, the horizontal axis represents the absolute value of the difference, and the vertical axis represents the sample number. The difference of each sample in the remaining sample set is taken as an absolute value, where overestimation and underestimation may be ignored.

Then, the absolute-value distribution is normalized and transformed to obtain a normalized distribution. The absolute value of the normalized difference L"(p,q) is as follows:

$$L''(x_i) = \frac{x_i - \text{Min(Loss)}}{\text{Max(Loss)} - \text{Min(Loss)}}.$$

Figure 8:
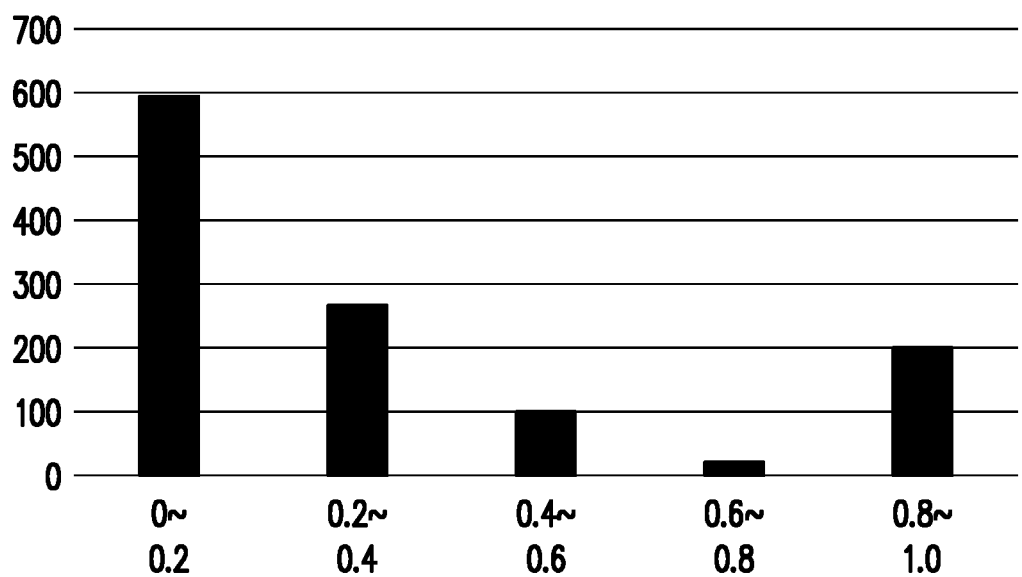
FIG. 8 is a schematic diagram of a normalized distribution according to an embodiment of the present disclosure.

FIG. 8 is a schematic diagram of a normalized distribution according to an embodiment of the present disclosure. In FIG. 8, the horizontal axis represents the absolute value of the normalized difference, and the vertical axis represents the sample number. The calculated loss value of the dataset is normalized and transformed to facilitate the comparison of samples in a high-dimensional space.

Finally, based on the normalized distribution, the remaining sample set is grouped into the hard sample set and the easy sample set. In the case of FIG. 8, the easy sample set is grouped starting from the samples whose normalized difference is 0 in absolute value. For example, the samples with the absolute value of the normalized difference between 0 and 0.2 are grouped into the easy sample set. If the sample number of the easy sample set has not reached the first threshold number, then the samples with the absolute value of the normalized difference between 0.2 and 0.4 are grouped into the easy sample set, and so on, until the sample number of the easy sample set reaches the first threshold number.

With the same principle, the hard sample set is grouped by starting from the samples with the absolute value of the normalized difference of 1. For example, the samples with the absolute value of the normalized difference between 0.8 and 1 are grouped into the hard sample set. If the sample number of the hard sample set has not reached the second threshold number, then the samples with the absolute value of the normalized difference between 0.6 and 0.8 are further grouped into the hard sample set, and so on, until the sample number of the hard sample set reaches the second threshold number.

Here, the first threshold number is, for example, 75% being the remaining sample set accounting for the total number, and the second threshold number is, for example, 25% being the remaining sample set accounting for the total number. However, the present disclosure is not limited thereto, as long as the first threshold number (the sample number of the easy sample set) is greater than the second threshold number (the sample number of the hard sample set).

Here is another example for illustration. Table 1 shows the comparison between the actual labeled results and the estimated results obtained by inputting the obtained field dataset into the existing model trained with the open-source dataset.

TABLE 1

| Estimated results | Actual labeled results | | | | |
|---|---|---|---|---|---|
| | 0 | 1 | 2 | 3 | 4 |
| 0 | 4132 | 90 | 87 | 15 | 30 |
| 1 | 51 | 16 | 3 | 0 | 0 |
| 2 | 30 | 77 | 619 | 55 | 38 |
| 3 | 0 | 1 | 164 | 124 | 44 |
| 4 | 3 | 10 | 249 | 130 | 153 |

In the embodiment shown in Table 1, the total sample number of the field dataset is 6121. The sample number whose estimated results obtained through the existing model is the same as its actual labeled results is 5044(4132+16+619+124+153), and the sample number whose estimated results is different from the actual labeled result is 1077.

Figure 9:
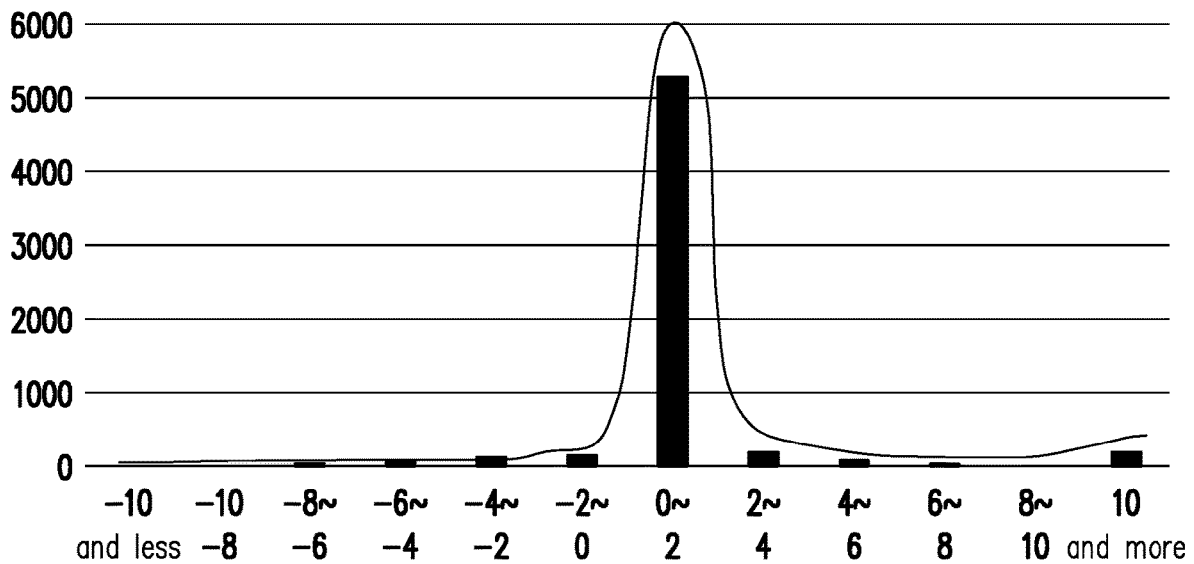
FIG. 9 is a difference distribution diagram based on Table 1 according to an embodiment of the present disclosure.
Figure 10:
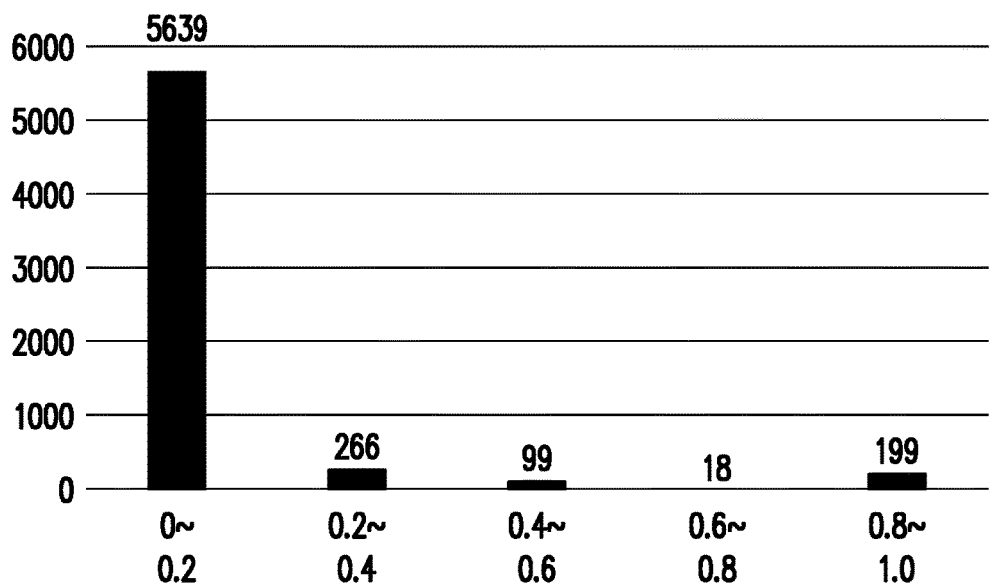
FIG. 10 is a normalized distribution diagram based on Table 1 according to an embodiment of the present disclosure.

FIG. 9 is a difference distribution diagram based on Table 1 according to an embodiment of the present disclosure. FIG. 10 is a normalized distribution diagram based on Table 1 according to an embodiment of the present disclosure. It shows clearly in FIG. 9 that the difference distribution is in a bell shape, meaning that it is a normal distribution. In other words, the field dataset is suitable for the existing model selected. After processes of removing the outlier sample set, obtaining the absolute value, and normalizing, the normalized distribution as shown in FIG. 10 is obtained. Then, it may base on the normalized distribution shown in FIG. 10 to group the remaining sample set into the hard sample set and the easy sample set. After obtaining the hard sample set and the easy sample set, the hard sample set and the easy sample set may be sent into the incremental learning framework to train the existing model. In this regard, a model suitable for the specified field may be built using a small sample number.

To sum up, in the above embodiments, it only takes a small sample number with actual labeled results used as the input of the existing model to establish rapidly and optimize a model, without the need to adopt the training samples of the existing model. Accordingly, this may assist big-data research or medical institutions to accelerate model building and accelerate the acquisition of US Food and Drug Administration (FDA) certification.

In the above embodiments, the outlier sample sets at the grouping boundary are found through the distribution relation of the high-dimensional characteristic vectors extracted by deep learning, so that the existing model may be modified and improved its classification accuracy. Moreover, while achieving the purpose of improving the accuracy of model classification, it also prevents affecting the classification and interpretation of old datasets.

In addition, the optimizability of existing models is evaluated through the statistical distribution of the loss function, and the samples with high similarity (the easy sample set) and the samples with low similarity (the hard sample set) to the existing model's classification probability characteristic are found through the normalized loss function to form a new dataset. The classification performance of the existing model may be obtained as the number of the easy sample set is greater than the number of the hard sample set. The new dataset obtained not only may be adapted to optimize the interpretation accuracy of the existing model, but also does not cause the problem of lowering the interpretation accuracy of the existing dataset by joining the new dataset.

What is claimed is:

1. A mining method for sample grouping, comprising:
performing following steps through a processor:
(a) obtaining an existing model that has been trained and a field dataset that is different from a training data set of the existing model, wherein the field dataset comprises a plurality of samples collected based on a specified field, and the plurality of samples comprises a plurality of corresponding actual labeled results, and a sample number of the field dataset is smaller than a sample number of the training data set of the existing model;
(b) inputting the plurality of samples respectively into the existing model, so as to obtain a plurality of estimated results;
(c) removing an outlier sample set from the field dataset based on a difference distribution of the plurality of estimated results and the plurality of actual labeled results, wherein the plurality of samples that remain in the field dataset after the outlier sample set is removed form a remaining sample set;
(d) grouping the remaining sample set into a hard sample set and an easy sample set based on the plurality of estimated results of the remaining sample set; and
(e) after obtaining the hard sample set and the easy sample set, sending the hard sample set and the easy sample set into an incremental learning framework to retrain the existing model, so that a retrained existing model becomes a model directed to the specified field corresponding to the field dataset to interpret data obtained in the specified field.

2. The mining method for sample grouping according to claim 1, wherein after step (b), the method further comprises:
calculating the difference distribution of the plurality of estimated results and the plurality of actual labeled results;
checking whether the difference distribution is a normal distribution through a normal distribution testing method;
performing step (c) and step (d) in sequence when the difference distribution is determined to be a normal distribution; and
selecting another existing model when the difference distribution is determined to be not a normal distribution, and performing step (b) again.

3. The mining method for sample grouping according to claim 2, wherein calculating the difference distribution of the plurality of estimated results and the plurality of actual labeled results comprises:
calculating a difference between an estimated result of each of the plurality of samples and a corresponding actual labeled result through a loss function to thereby obtain the difference distribution.

4. The mining method for sample grouping according to claim 3, wherein the loss function adopts cross entropy.

5. The mining method for sample grouping according to claim 3, wherein step (c) comprises:
determining a sample with the difference greater than a first setting value or a sample with the difference smaller than a second setting value as an outlier sample set.

6. The mining method for sample grouping according to claim 3, wherein step (d) comprises:
- calculating an absolute value of the difference corresponding to each of the plurality of samples in the remaining sample set, so as to obtain an absolute-value distribution;
- performing a normalization conversion on the absolute-value distribution, so as to obtain a normalized distribution; and
- based on the normalized distribution, grouping the remaining sample set into the hard sample set and the easy sample set.

7. The mining method for sample grouping according to claim 6, wherein based on the normalized distribution, grouping the remaining sample set into the hard sample set and the easy sample set comprises:
- grouping samples that meet a first threshold number into the easy sample set, starting from a sample with an absolute value of a normalized difference in the normalized distribution being 0; and
- grouping samples that meet a second threshold number into the hard sample set, starting from a sample with an absolute value of a normalized difference in the normalized distribution being 1.

8. The mining method for sample grouping according to claim 1, wherein a sample number of the easy sample set is greater than a sample number of the hard sample set.

* * * * *